US012767347B2

(12) United States Patent
Courpet et al.

(10) Patent No.: US 12,767,347 B2

(45) Date of Patent: Oct. 20, 2026

(54) PROPULSION SYSTEM FOR AN AIRCRAFT COMPRISING AN AT LEAST PARTIALLY VENTILATED PIPE CIRCUIT

(71) Applicant: Airbus Operations SAS, Toulouse (FR)

(72) Inventors: Alexis Courpet, Toulouse (FR); Jacky Puech, Toulouse (FR); Solène Cruaud-Prieur, Toulouse (FR); Fabien Poussou, Toulouse (FR); Jérôme Neny, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 19/341,206

(22) Filed: Sep. 26, 2025

(65) Prior Publication Data

US 2026/0091882 A1 Apr. 2, 2026

(30) Foreign Application Priority Data

Sep. 30, 2024 (FR) ...................................... 2410442

(51) Int. Cl.

| | |
|---|---|
| ***B64D 37/34*** | (2006.01) |
| ***B64D 27/16*** | (2006.01) |
| ***B64D 27/40*** | (2024.01) |
| ***B64D 37/04*** | (2006.01) |
| *F02C 7/22* | (2006.01) |

(52) U.S. Cl.

CPC ............ *B64D 37/34* (2013.01); *B64D 27/16* (2013.01); *B64D 27/402* (2024.01); *B64D 37/04* (2013.01); *F02C 7/222* (2013.01)

(58) Field of Classification Search

CPC ........ B64D 37/34; B64D 37/04; B64D 37/18; F02C 7/222

See application file for complete search history.

(56) References Cited

U.S. PATENT DOCUMENTS

| | | | | |
|---|---|---|---|---|
| 5,052,176 | A * | 10/1991 | Labatut | F23R 3/20 60/761 |
| 11,905,914 | B2 * | 2/2024 | Ledwith, Jr. | F02K 9/62 |
| 12,429,014 | B2 * | 9/2025 | Lafont | F02K 1/822 |

(Continued)

FOREIGN PATENT DOCUMENTS

| | | |
|---|---|---|
| FR | 3120603 A1 | 9/2022 |
| FR | 3146880 A1 | 9/2024 |

OTHER PUBLICATIONS

French Search Report for corresponding French Patent Application No. 2410442 dated Apr. 14, 2025.

*Primary Examiner* — Brian M O'Hara

(74) *Attorney, Agent, or Firm* — Greer, Burns & Crain, Ltd.

(57) ABSTRACT

A propulsion system, including a fuel tank, a turbojet including an engine and a fan blowing an airflow, a pipe circuit including a single-skin conduit extending from the tank and a second pipe portion including two double-skin conduits and fluidically connecting the single-skin conduit and a connection interface with the engine. The second portion also includes a second connector arranged between the two double-skin conduits and an air supply conduit fluidically connecting the fan and the double-skin conduits to cause a part of the airflow from the fan to enter the double-skin conduits and to cool the double-skin conduits.

11 Claims, 4 Drawing Sheets

(56) References Cited

U.S. PATENT DOCUMENTS

| | | | | |
|---|---|---|---|---|
| 12,618,373 | B2 * | 5/2026 | Devasigamani .......... | F02C 3/22 |
| 2015/0330312 | A1 | 11/2015 | Delgado et al. | |
| 2022/0289396 | A1 | 9/2022 | Horde et al. | |
| 2024/0317418 | A1 | 9/2024 | Lafont | |

* cited by examiner

Fig. 1
Prior Art
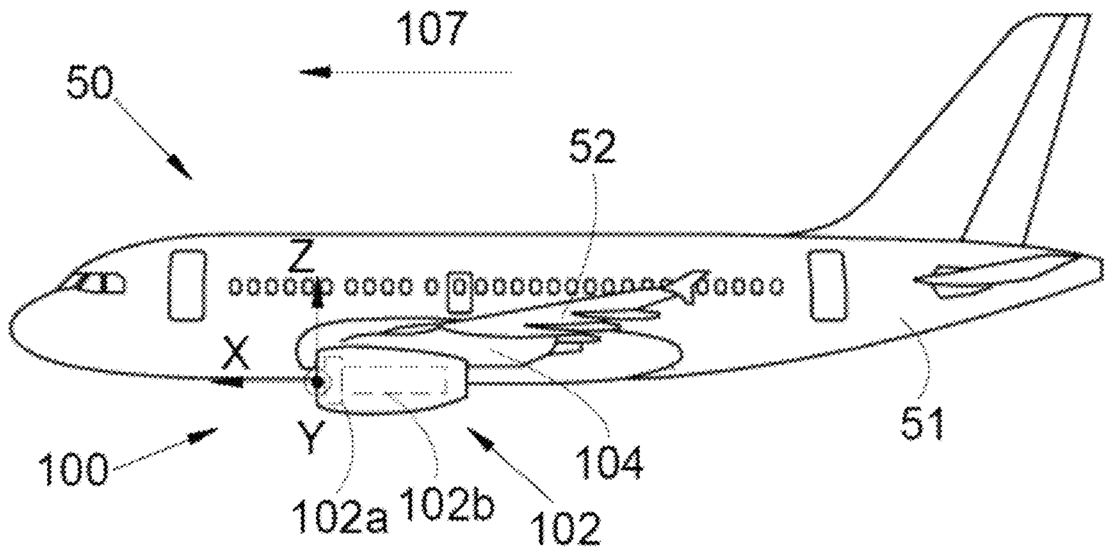
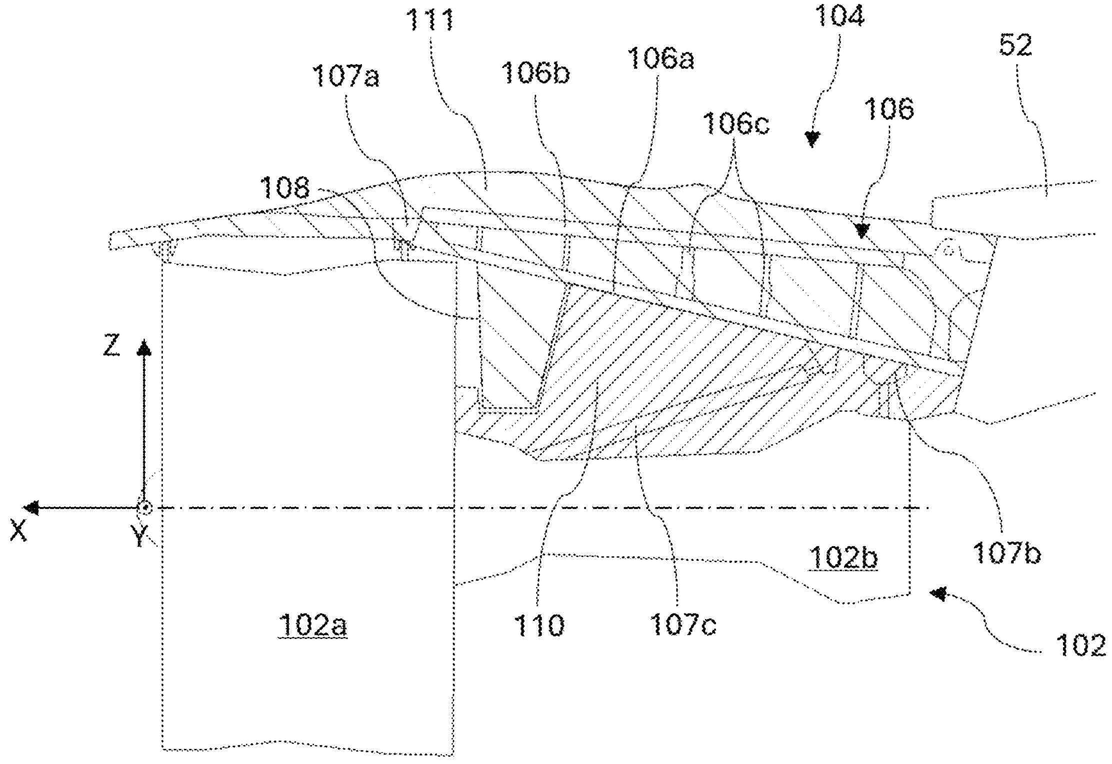
Fig. 2
Prior Art

PROPULSION SYSTEM FOR AN AIRCRAFT COMPRISING AN AT LEAST PARTIALLY VENTILATED PIPE CIRCUIT

CROSS-REFERENCES TO RELATED APPLICATIONS

This application claims the benefit of French Patent Application Number FR2410442 filed on Sep. 30, 2024, the entire disclosure of which is incorporated herein by way of reference.

FIELD OF THE INVENTION

The present invention relates to a propulsion system for an aircraft comprising an at least partially ventilated pipe circuit and an aircraft comprising such a propulsion system.

BACKGROUND OF THE INVENTION

As illustrated in FIG. 1, an aircraft 50 comprises a fuselage 51 and a wing 52 on each side of the fuselage 51. At least one propulsion system 100 is fixed below each wing 52 and comprises a turbojet 102 which is fixed to the wing 52 by an engine pylon 104.

Conventionally, X denotes the longitudinal axis of the propulsion system 100 corresponding to a longitudinal axis X of the turbojet 102. Moreover, Y denotes the transverse axis of the system 100 corresponding to a transverse axis of the turbojet 102, this axis being horizontal when the aircraft is on the ground, and Z denotes the vertical axis or the vertical height of the propulsion system 100 corresponding to a vertical axis of the turbojet 102, this axis being vertical when the aircraft is on the ground, these three axes X, Y, Z being mutually at right-angles.

Moreover, the terms "front" and "rear" are to be considered relative to a direction of displacement to the front of the aircraft when the turbojet 102 is in operation, this direction being illustrated by the arrow 107. The turbojet 102 also has a vertical median plane XZ passing through the longitudinal axis X and the vertical axis Z.

The turbojet 102 comprises, at the front, a fan housing 102*a* surrounding a tubular fan duct in which a fan rotates and, at the rear of the fan housing 102*a*, a central housing 102*b* of smaller size enclosing the core of the turbojet 102. The fan housing 102*a* and the central housing 102*b* generally extend coaxially about the longitudinal axis X.

FIG. 2 shows a propulsion system 100 according to the prior art with the turbojet 102 and the engine pylon 104 by which the turbojet 102 is fixed to the wing 52. The engine pylon 104 is represented here by its primary structure 106 which is fixed below the wing 52.

The primary structure 106 extends along the longitudinal axis X between a front end and a rear end, and takes the form of a box structure which comprises a lower longitudinal member 106*a*, an upper longitudinal member 106*b*, two lateral panels (not illustrated) connecting the two longitudinal members and internal ribs 106*c* distributed along the box structure 106.

The turbojet 102 is fixed below the engine pylon 104 by means of engine mountings which conventionally comprise, at the front, a front engine mount 107*a*, at the rear, a rear engine mount 107*b* and, between the front and rear engine mounts, an assembly for absorbing thrust force comprising force-absorbing connecting rods 107*c* fixed between the turbojet 102 and the box structure 106 in order to absorb the thrust forces generated by the turbojet 102.

The engine pylon 104 also comprises a secondary structure 108 which is arranged in the region of the front end of the box structure 106 and below the lower longitudinal member 106*a*. This secondary structure is located directly opposite the fan housing 102*a*. In other words, the secondary structure 108 of the engine pylon 104 is located below the box structure 106 and to the rear of the fan.

As illustrated in hatched lines in FIG. 2, the first zone 110 located between the lower longitudinal member 106*a*, the secondary structure 108 and the central housing 102*b* of the turbojet is exposed to very high temperatures and this first zone 110 thus constitutes a zone at significant risk of fire.

The second zone 111, which is located inside the box structure 106 and below the fairings of the engine pylon 104, contains numerous pieces of equipment and, in particular, conduits for supplying and discharging fluids necessary for the operation of the turbojet 102. In particular, conduits for supplying fuel extend between the tank (generally located in the wing 52) and the engine of the turbojet 102. Similarly, conduits for discharging fuel, for example in the case of a leakage thereof, extend in the second zone 111. In order to guarantee optimal safety and operation of these conduits (in particular relative to high temperatures in the zone 111) it is necessary to ventilate the second zone 111 in order to maintain a lower temperature therein than in the first zone 110.

A drawback with this solution is that the second zone 111 to be cooled is extensive and requires significant ventilation means. Moreover, due to the large dimensions of the second zone 111 to be ventilated, it is relatively difficult to monitor the temperature of the second zone 111 locally. In particular, it is difficult to ensure that the equipment at risk (such as the fuel conduits for example) are in an environment where the temperature is optimal.

Thus there is a need to provide an optimal thermal protection of the fuel conduits of an aircraft propulsion system which remedies at least some of these drawbacks.

SUMMARY OF THE INVENTION

A subject of the present invention is to propose a propulsion system for an aircraft, proposing a solution for the thermal protection of the conduits for transporting fuel in the region of the box structure of the engine pylon.

To this end, a propulsion system for an aircraft is proposed, comprising:

- a tank which is designed to contain a fuel and to be arranged in a wing of the aircraft, the tank comprising a first connection interface;
- a turbojet comprising:
  - an engine having a second connection interface; and
  - a fan designed to blow an airflow from the front to the rear of the aircraft, a third connection interface being arranged in the airflow upstream of the fan;
- a pipe circuit comprising a first connector and a single-skin conduit extending between the first connection interface of the tank and the first connector, and a second pipe portion, comprising:
  - a second connector arranged between the first connector and the second interface of the engine;
  - a first double-skin conduit extending between the first connector and the second connector;
  - a second double-skin conduit extending between the second connector and the second interface of the engine.

In particular, the first and second double-skin conduits each comprise a central conduit delimiting a central channel in which the fuel flows and a peripheral conduit extending about the central conduit and delimiting with the central conduit a peripheral channel. The second connector ensures the fluidic continuity between the central channels of the first and second double-skin conduits and the fluidic continuity between the peripheral channels of the first and second double-skin conduits. The second connector comprises an inlet orifice which opens into the peripheral channel of the first double-skin conduit or the second double-skin conduit.

According to the invention, the pipe circuit also comprises a conduit for supplying air, fluidically connecting the third connection interface of the fan and the inlet orifice so as to cause a part of the airflow from the fan to enter the peripheral channels of the first and second double-skin conduits.

In this manner, the invention proposes a solution which is simple to implement and which makes it possible to ventilate and thus to cool the central channel of a double-skin conduit transporting fuel between the tank located in the wing of the aircraft and the engine located in the turbojet. Air is continuously supplied to the peripheral channel when the turbojet is in operation, so that the central channel of the double-skin conduits is cooled.

Advantageously, the second connector comprises:

- a first plate and a second plate respectively receiving a first end of the first double-skin conduit and a first end of the second double-skin conduit;
- a first sealing washer arranged between the first and second plates.

In particular, one of the plates comprises the inlet orifice. The plates and the first washer each comprise a central bore, the central bores making it possible to connect fluidically the central channels of the first and second double-skin conduits. The first plate comprises a plurality of first holes opening into the peripheral channel of the first double-skin conduit, where the second plate comprises, for each first hole, a second hole opening into the peripheral channel of the second double-skin conduit, where the first washer comprises, for each first hole, a third hole fluidically connecting the associated first hole and second hole.

According to one particular aspect of the invention, the central and peripheral conduits of the first double-skin conduit are fixed to the first plate by welding and the central and peripheral conduits of the second double-skin conduit are fixed to the second plate by welding.

According to a further particular aspect of the invention, the second connector comprises first clamping means configured to clamp the first and second plates to one another.

According to one particular aspect of the invention, the first connector comprises:

- a third plate receiving a first end of the single-skin conduit and a fourth plate receiving a second end of the first double-skin conduit;
- a second sealing washer arranged between the third and fourth plates.

In particular, the fourth plate comprises a discharge orifice opening into the peripheral channel of the first double-skin conduit and fluidically connecting the peripheral channel of the first double-skin conduit outside the pipe circuit.

The third and fourth plates and the second washer each comprise a central bore, the central bores fluidically connecting the central channel of the first double-skin conduit and the single-skin conduit.

According to a further particular aspect of the invention, the single-skin conduit is fixed to the third plate by welding and the central and peripheral conduits of the first double-skin conduit are fixed to the fourth plate by welding.

According to a further particular aspect of the invention, the first connector comprises second clamping means configured to clamp the third and fourth plates to one another.

According to one particular aspect of the invention, the second interface comprises a fifth plate receiving a second end of the second double-skin conduit, the fifth plate comprising:

- a central bore extending coaxially and being fluidically connected to the central conduit of the second double-skin conduit, the central bore also being designed to be fluidically connected to a circuit for supplying the engine with fuel;
- a discharge orifice fluidically connecting the peripheral channel of the second double-skin conduit to the outside of the pipe circuit.

The invention also relates to an aircraft comprising a propulsion system such as described above and a box structure of an engine pylon, the box structure forming a primary structure and comprising a lower longitudinal member, the propulsion system being fixed to the lower longitudinal member.

According to one particular aspect of the invention, the single-skin conduit extends above the box structure and the first double-skin conduit and/or the second double-skin conduit pass through the box structure in the region of at least one opening.

According to a further particular aspect of the invention, each opening comprises a sealing gasket configured to ensure the seal between the box structure and the first double-skin conduit or the second double-skin conduit passing through the opening.

According to one particular aspect of the invention, the aircraft also comprises a secondary structure fixed below the box structure and to the rear of the fan, the second interface comprising third fixing means configured to fix the second interface to the secondary structure.

BRIEF DESCRIPTION OF THE DRAWINGS

The above-mentioned features of the invention, and others, will appear more clearly by reading the following description of an exemplary embodiment, the description being made in relation to the accompanying drawings, in which:

FIG. 1 is a side view of an aircraft;

FIG. 2 is a side view and sectional view of a propulsion system according to the prior art;

DETAILED DESCRIPTION OF THE PREFERRED EMBODIMENTS

Figure 3:
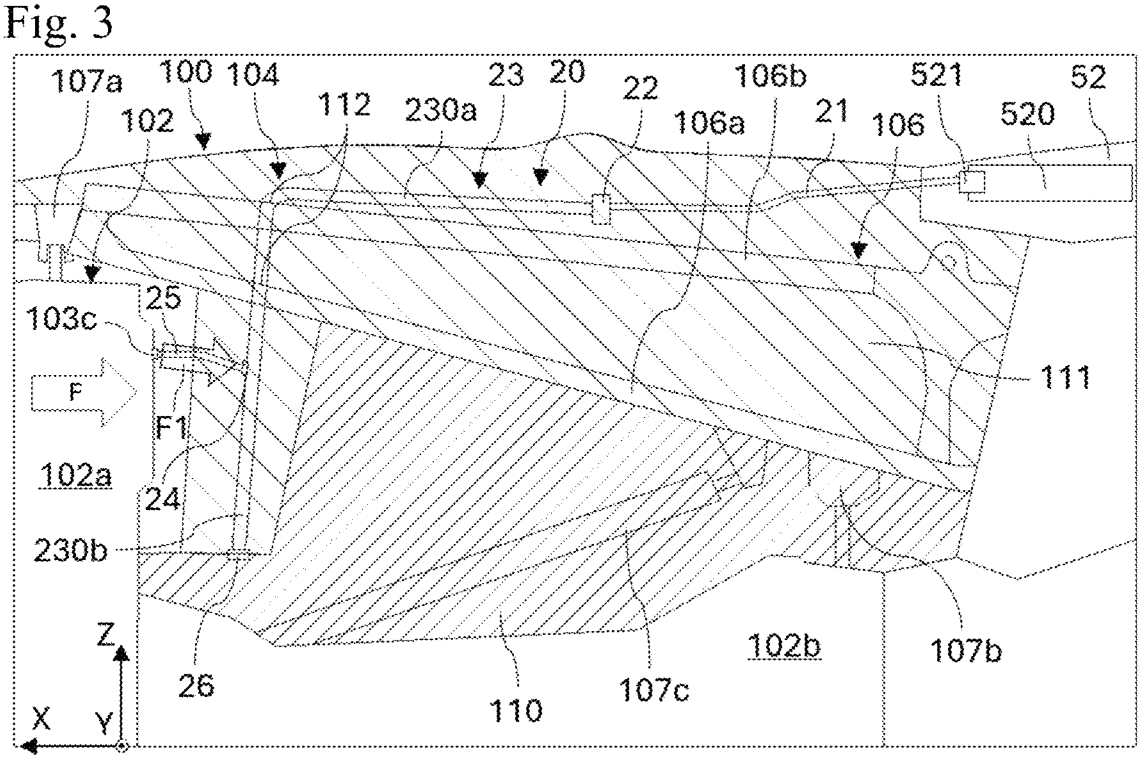
FIG. 3 is a side view and sectional view of a propulsion system according to the invention.

FIG. 1 illustrates an aircraft 50 according to the invention which comprises a fuselage 51 and a wing 52 on each side of the fuselage 51. At least one propulsion system 100 is fixed below each wing 52 and comprises a turbojet 102 fixed to the wing 52 by an engine pylon 104.

The turbojet 102 comprises, at the front, a fan housing 102*a* surrounding a tubular fan duct in which a fan rotates, which fan is designed to blow an airflow F originating from the outside of the aircraft 50 from the front to the rear of the aircraft 50 and, at the rear of the fan housing 102*a*, a central housing 102*b* of smaller size enclosing the engine of the turbojet 102. The fan housing 102*a* and the central housing 102*b* extend generally coaxially about the longitudinal axis X.

FIG. 3 shows the propulsion system 100 with the turbojet 102 and the engine pylon 104 via which the turbojet 102 is fixed to the wing 52. The engine pylon 104 is represented here by its primary structure 106 which is fixed below the wing 52.

The primary structure 106 extends along the longitudinal axis X between a front end and a rear end, and takes the form of a box structure 106 which comprises a lower longitudinal member 106*a*, an upper longitudinal member 106*b*, two lateral panels (not illustrated) connecting the two longitudinal members and two internal ribs 106*c* distributed along the box structure 106.

The engine pylon 104 also comprises a secondary structure 108 which is arranged in the region of the front end of the box structure 106. More particularly, the secondary structure 108 is fixed below the box structure 106 and to the rear of the fan.

FIG. 3 illustrates an example of a propulsion system 100 (hereinafter called the “system”) according to the invention. FIGS. 4 to 7 illustrate the details of this system 100.

More particularly, the propulsion system 100 for an aircraft 50 comprises a tank 520 which is designed to contain a fuel and to be arranged in a wing 52 of the aircraft 50. The tank 520, which is thus located above the box structure 106, comprises a first connection interface 521. The system 100 also comprises a turbojet 102 which comprises an engine having a second connection interface 26 and, as described above, a fan which is designed to blow an airflow F from the front to the rear of the aircraft 50. The system 100 also comprises a third connection interface 103*c* which is arranged in the airflow upstream of the fan so as to receive the airflow F. In this example, the third connection interface 103*c* is fixed to a wall of the fan housing 102*a*.

The system 100 also comprises a pipe circuit 20 which makes it possible, in particular, to supply fuel to the engine. The circuit 20 comprises a first connector 22 (described in detail in the remainder of the description) and a single-skin conduit 21 extending between the first connection interface 521 of the tank 520 and the first connector 22. In other words, the single-skin conduit is connected to the tank 520 by the first connection interface 521 so as to transport fuel originating from the tank 520.

The circuit 20 also comprises a second pipe portion 23 which comprises:

- a second connector 24 which is arranged between the first connector 22 and the second interface 26 of the engine;
- a first double-skin conduit 230*a* which extends between the first connector 22 and the second connector 24; and
- a second double-skin conduit 230*b* which extends between the second connector 24 and the second interface 26 of the engine.

Figure 5:
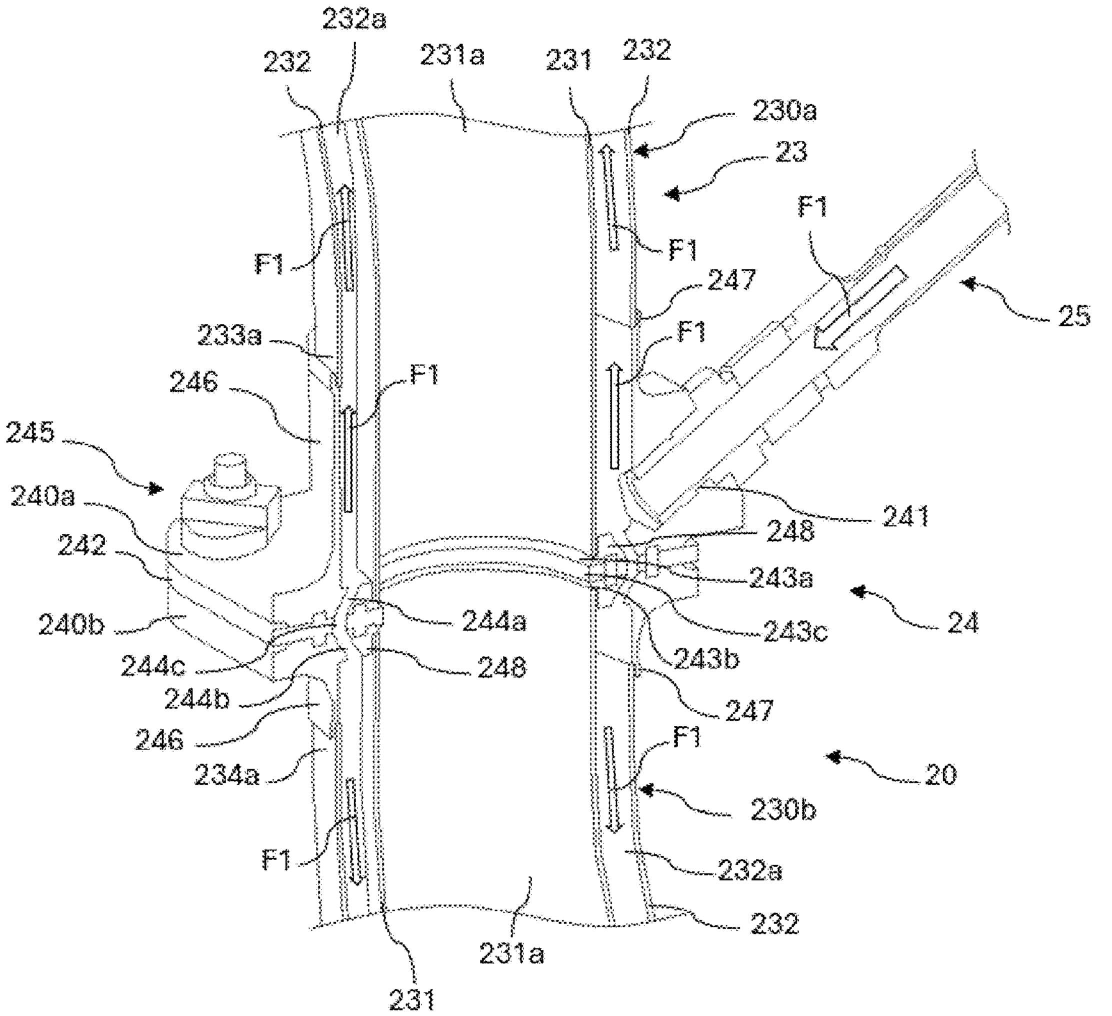
FIG. 5 is a perspective and sectional view of a second connector of the pipe circuit according to the invention.

As illustrated in FIG. 5, which shows the second connector 24 in detail, the first 230*a* and second 230*b* double-skin conduits each comprise a central conduit 231 delimiting a central channel 231*a* in which the fuel flows and a peripheral conduit 232 extending about the central conduit 231 and delimiting with the central conduit 231 a peripheral channel 232*a*. The second connector 24 makes it possible to ensure the fluidic continuity between the central channels 231*a* of the first 230*a* and second 230*b* double-skin conduits and the fluidic continuity between the peripheral channels 232*a* of the first 230*a* and second 230*b* double-skin conduits.

According to the invention, the second connector 24 comprises an inlet orifice 241 which opens into the peripheral channel 232*a* of the first double-skin conduit 230*a* (as illustrated in this example) or of the second double-skin conduit 230*b* (variant not illustrated). The circuit 20 also comprises an air supply conduit 25 fluidically connecting the third connection interface 103*c* of the fan and the inlet orifice 241 so as to cause a part F1 of the airflow F from the fan to enter the peripheral channels 232*a* of the first 230*a* and second 230*b* double-skin conduits.

In this manner, the invention proposes a solution which is simple to implement and which makes it possible to ventilate, and thus to cool, the central channel 231*a* of a double-skin conduit 230*a*, 230*b* transporting fuel between the tank 520 located in the wing 52 of the aircraft 50 and the engine located in the turbojet 102. Air is thus continuously supplied to the peripheral channel 232*a* when the turbojet 102 is in operation, so that the central channel 231*a* of the double-skin conduits 230*a* and 230*b* is ventilated and cooled.

Although the second portion 23 of the circuit 20 passes through the second zone 111 which has high temperatures, the invention enables the fuel to be safely transported between the tank 520 and the engine. This ventilation of the second portion 23 of the pipe circuit 20 thus makes it possible to avoid any risk of the pipework becoming blocked, due to the high temperatures of the second zone 111 passed through by the circuit 20.

More specifically, the invention proposes a pneumatic ventilation of the central channel 231*a* by drawing air originating from the fan, so as to ventilate the peripheral channel 232*a* of the double-skin conduits 230*a* and 230*b*. Thus the peripheral channel 232*a* constitutes a zone to be ventilated which has a significantly lower volume than the volume of the second zone 111, which generally has to be fully ventilated according to the solutions of the prior art.

This localized ventilation around the central channel 231*a*, in which the fuel flows, makes it possible to reduce the zones to be ventilated inside the box structure 106. In other words, it makes it possible to reduce the subdivision of the box structure 106 into zones, which requires the different zones to be sealed, in particular by manually using sealant, and this seal to be monitored. As a result, the invention leads to a significant time saving. This results in not insignificant gains in terms of manufacturing cost.

Finally, the invention makes it possible to provide a solution improving the safety of the pipes transporting fuel, while reducing the risks of problems associated with these pipes in the event of high temperatures.

As illustrated in FIG. 5, the second connector 24 comprises a first plate 240*a* and a second plate 240*b* respectively receiving a first end 233*a* of the first double-skin conduit 230*a* and a first end 234*a* of the second double-skin conduit 230*b*. The second connector 24 also comprises a first sealing washer 242 which is arranged between the first 240*a* and second plates 240*b*.

As indicated above, the second connector 24 comprises an inlet orifice 241 which opens into the peripheral channel 232*a* of the first 230*a* or second 230*b* double-skin conduit. More particularly, one of the plates 240*a*, 240*b* (the first plate 240*a* in this example) comprises the inlet orifice 241.

In order to make it possible to connect fluidically the central channels 231*a* of the first 230*a* and second 230*b* double-skin conduits, the plates 240*a* and 240*b* and the first washer 242 each comprise a central bore 243*a*, 243*b*, 243*c*. The central bores thus make it possible to ensure a fluidic continuity of the central channel 231*a* of the first double-skin conduit 230*a* relative to the central channel 231*a* of the double-skin conduit 230*b*.

In the same manner and to make it possible to connect fluidically the peripheral channels 232*a* of the first 230*a* and second 230*b* double-skin conduits, the first plate 240*a* comprises a plurality of first holes 244*a* opening into the peripheral channel 232*a* of the first double-skin conduit 230*a*. The second plate 240*b* comprises, for each first hole 244*a*, a second hole 244*b* which opens into the peripheral channel 232*a* of the second double-skin conduit 230*b*. Finally, the first washer 242 comprises, for each first hole 244*a*, a third hole 244*c* which fluidically connects the associated first hole 244*a* and second hole 244*b*.

Such a second connector 24 makes it possible to provide a simple solution for connecting an air inlet from the fan to the double-skin conduits 230*a* and 230*b* so as to cool the conduits permanently when the turbojet 102 is in operation.

Moreover, such a second connector 24 makes it possible to provide a simple installation of the pipe circuit 20 while adding a ventilation of the double-skin conduits 230*a* and 230*b*. Such a second connector 24 also has a simple structure and thus is inexpensive.

More specifically, the central 231 and peripheral 232 conduits of the first double-skin conduit 230*a* are fixed to the first plate 240*a* by welding. In the same manner, the central 231 and peripheral 232 conduits of the second double-skin conduit 230*b* are fixed to the second plate 240*b* by welding.

As illustrated in this example, the plates 240*a* and 240*b* each comprise a wall 246 of which the cross section is of identical shape to the shape of the cross section of the peripheral conduit 232 and which extends coaxially to the double-skin conduits 230*a* and 230*b*. This wall 246 has a shoulder 247 to which the end of the peripheral conduit 232 of the associated double-skin conduit 230*a* or 230*b* is fixed. Moreover, a shoulder 248 is formed in the vicinity of the central bore 243*a*, 243*b* of each plate 240*a* and 240*b*, the end of the central conduit 231 of the associated double-skin conduit 230*a* or 230*b* being fixed to the shoulder.

Preferably, the fixing is carried out by means of welding of the TIG (tungsten inert gas) type.

A fixing by welding makes it possible to ensure an optimal fixing of the central 231 and peripheral 232 conduits to the plates 240*a* and 240*b*. Such a fixing also makes it possible to ensure an optimal seal of the joint between the double-skin conduits 230*a* and 230*b* and the plates 240*a* and 240*b*.

The second connector 24 also comprises first clamping means 245 configured to clamp the first and second plates 240*a*, 240*b* to one another. This makes it possible to bring the first and second plates together in order to squash/clamp the sealing washer 242. In this manner, the risks of leakage inside the second connector 24 are limited.

Figure 4:
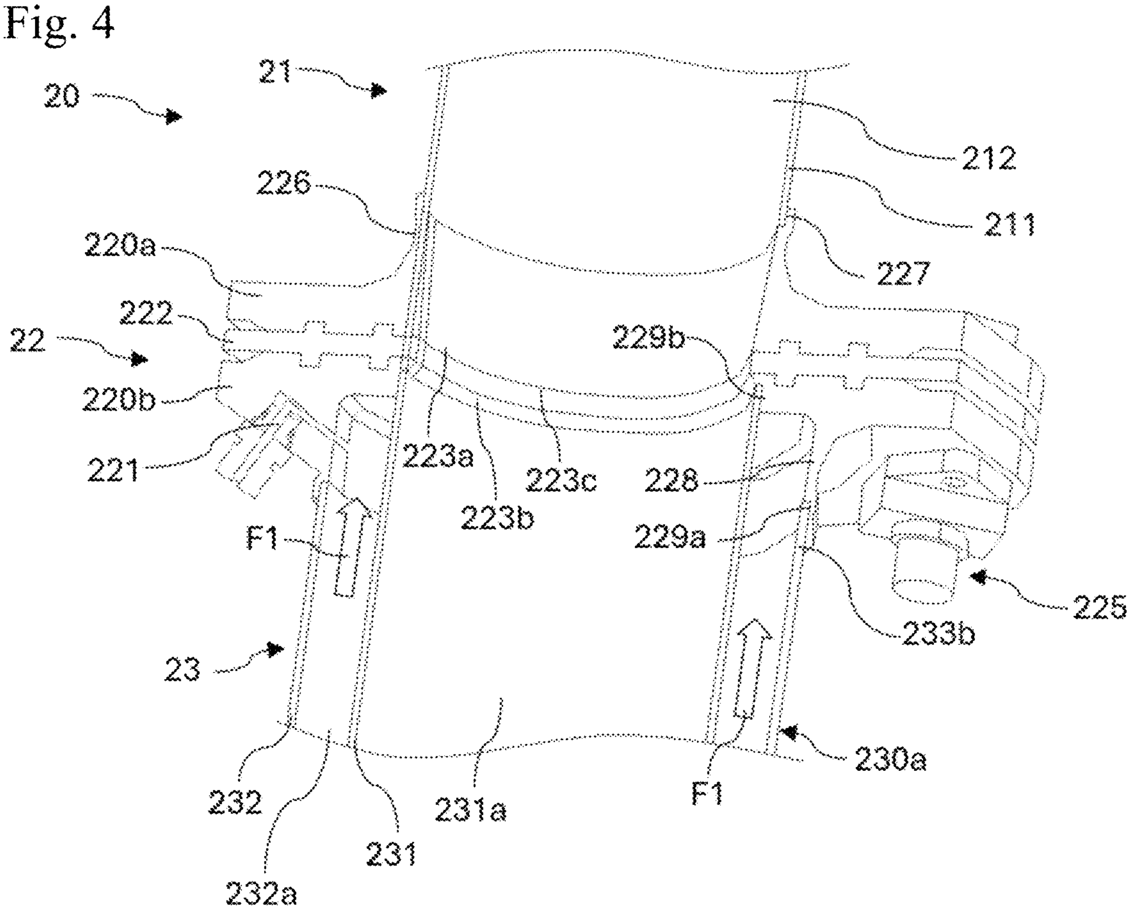
FIG. 4 is a perspective and sectional view of a first connector of the pipe circuit according to the invention.

As illustrated in FIG. 4, the first connector 22 comprises a third plate 220*a* receiving a first end 211 of the single-skin conduit 21 and a fourth plate 220*b* receiving a second end 233*b* of the first double-skin conduit 230*a*. The first connector 22 also comprises a second sealing washer 222 arranged between the third 220*a* and fourth 220*b* plates.

Moreover, in this case the fourth plate 220*b* comprises a discharge orifice 221 which leads into the peripheral channel 232*a* of the first double-skin conduit 230*a* and which fluidically connects the peripheral channel 232 of the first double-skin conduit 230*a* to the outside of the pipe circuit 20. In this manner, the part of the flow F1 can circulate inside the second portion 23 between the second connector 24 and the first connector 22. Moreover, the discharge orifice 221 also makes it possible to empty, i.e., to drain, the peripheral channel 232*a* in the case of a leakage of fuel originating from the central conduit 231*a*. The part of the airflow F1 circulating in the peripheral channel 232*a* also makes it possible to assist the emptying of fuel which has leaked from the central channel 231*a* toward the peripheral channel 232*a*.

The single-skin conduit 21 delimits a central channel 212 in which the fuel flows. Moreover, the third and fourth plates 220*a* and 220*b* and the second washer 222 each comprise a central bore 223*a*, 223*b*, 223*c*. These central bores 223*a*, 223*b*, 223*c* fluidically connect the central channel 231 of the first double-skin conduit 230*a* and the central channel 212 of the single-skin conduit 21. The central bores 223*a*, 223*b*, 223*c* thus make it possible to ensure a fluidic continuity from the central channel 212 of the single-skin conduit 21 toward the central channel 231*a* of the first double-skin conduit 230*a*.

In particular, the single-skin conduit 21 is fixed to the third plate 220*a* by welding and the central conduit 231 and the peripheral conduit 232 of the first double-skin conduit 230*a* are fixed to the fourth plate 220*b* by welding.

As illustrated in this example, the third plate 220*a* comprises a wall 226 of which the cross section is of identical shape to the shape of the cross section of the single-skin conduit 21 and which extends coaxially to the single-skin conduit 21. This wall 226 has a shoulder 227 to which the end 211 of the single-skin conduit 21 is fixed.

The fourth plate 220*b* also comprises a wall 228 of which the cross section is of identical shape to the shape of the cross section of the peripheral conduit 232 of the first double-skin conduit 230*a* and which extends coaxially to the double-skin conduit 230*a*. This wall 228 has a shoulder 229*a* to which the end 233*b* of the peripheral conduit 232 of the first double-skin conduit 230*a* is fixed. Moreover, a shoulder 229*b* is formed in the vicinity of the central bore 223*b* of the fourth plate 220*b*, the end of the central conduit 231 of the first double-skin conduit 230*a* being fixed to the shoulder.

Preferably, the fixing of the single-skin conduit 21 to the third plate 220*a* is carried out by means of welding of the TIG (tungsten inert gas) type. The same applies to the fixing of the first double-skin conduit 230*a* to the fourth plate 220*b*.

A fixing by welding makes it possible to ensure an optimal fixing of the single-skin conduit 21 to the third plate 220*a* and the central 231 and peripheral 232 conduits of the first double-skin conduit to the fourth plate 220*b*. Such a fixing also makes it possible to ensure an optimal sealing of the joint between the single-skin conduit 21 and the third plate 220*a* and between the first double-skin conduit 230*a* and the fourth plate 220*b*.

As in the case of the second connector 24, the first connector 22 comprises second clamping means 225 configured to clamp the third and fourth plates 220*a*, 220*b* to one another. This makes it possible to bring the third and fourth plates 220*a* and 220*b* together in order to squash/clamp the second sealing washer 222. In this manner, the risks of leakage inside the first connector 22 are limited.

Figure 6:
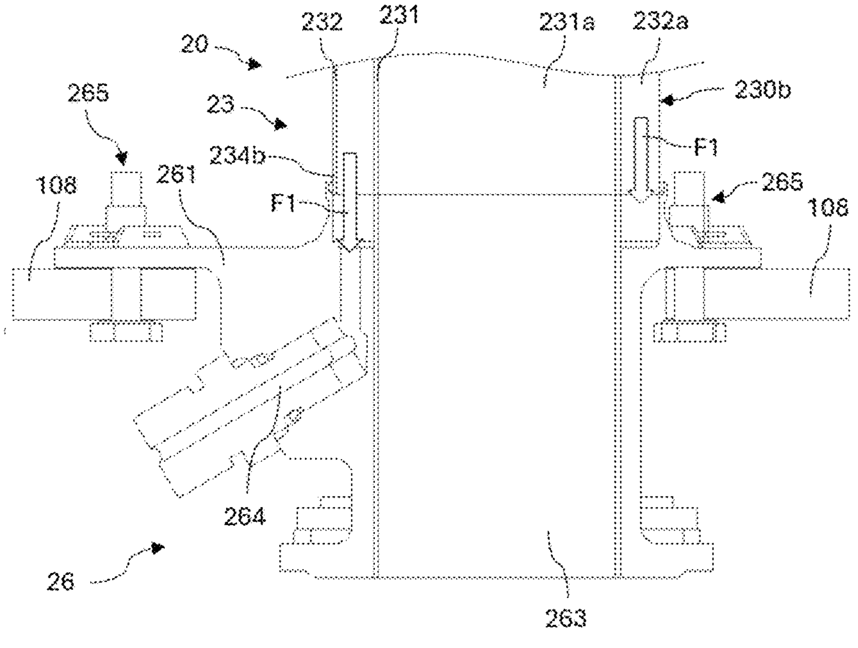
FIG. 6 is a perspective and sectional view of a connection interface of the pipe circuit according to the invention.

As illustrated in FIG. 6, the second interface 26 comprises a fifth plate 261 receiving a second end 234*b* of the second double-skin conduit 230*b*. The fifth plate 26 comprises a central bore 263 which extends coaxially to the central conduit 231 of the second double-skin conduit 230*b*. The central bore 263, on the one hand, is fluidically connected to the central conduit 231 of the second double-skin conduit 230*b* and, on the other hand, is designed to be fluidically connected to a circuit for supplying the engine with fuel, for example via a supply conduit (not shown).

The second interface 26 also comprises a discharge orifice 264 which fluidically connects the peripheral channel 232*a* of the second double-skin conduit 230*b* to the outside of the pipe circuit 20. For example, the discharge orifice 264 can be attached to a line connected to the drain mast of the aircraft. This drain mast enables the pilot to verify if there are leakages and, before take-off, to establish the zones in which these leakages are located.

In this manner, the part of the flow F1 can circulate inside the second portion 23 between the second connector 24 and the second interface 26. This discharge orifice 264 makes it possible to empty, i.e., drain, the peripheral channel 232*a* in the case of a leakage of fuel from the central conduit 231*a*. The part of the airflow F1 circulating in the peripheral channel 232*a* also makes it possible to assist the emptying of the fuel which has leaked from the central channel 231*a* toward the peripheral channel 232*a*.

The second portion 23 thus makes it possible to provide permanent ventilation of the central conduit 231 transporting the fuel, by causing a part F1 of the airflow F from the fan to flow in the peripheral channel 232*a*. This second portion 23 also makes it possible to ensure optimal drainage of the peripheral channel 232*a* due to the airflow F1 circulating therein.

As described above, the engine pylon 104 comprises a secondary structure 108 which is fixed below the box structure 106 and to the rear of the fan. The second interface 26 comprises third fixing means 265 which are configured to fix the second interface 26 to the secondary structure 108.

The first 245, second 225 and third 265 fixing means are conventional and not described in detail here. For example, the fixing means are in the form of screw elements which make it possible to provide a clamping of the elements to be fixed therebetween.

As illustrated in FIG. 3, the single-skin conduit 21 of the circuit 20 extends above the box structure 106, and more specifically above the upper longitudinal member 106*b*. The first double-skin conduit 230*a* and/or the second double-skin conduit 230*b* pass through the box structure 106 in the region of at least one opening 112. In this example, the first double-skin conduit 230*a* passes through the upper longitudinal member 106*b* and the lower longitudinal member 106*a* in the region of two openings 112. Naturally it is understood that, as a function of the position of the second connector 24, the second double-skin conduit 230*b* might be the only one to pass through the box structure 106, or the first 230*a* and the second 230*b* double-skin conduits both pass through the box structure 106.

Figure 7:
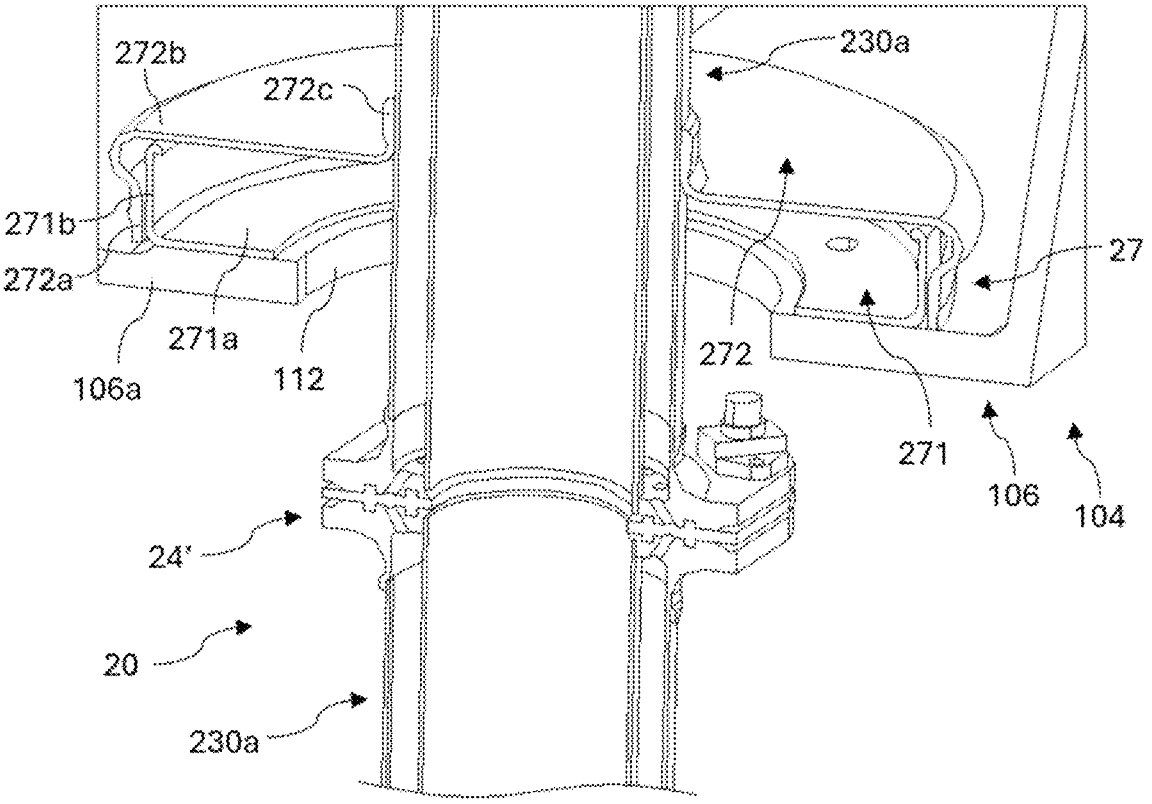
FIG. 7 is a perspective and sectional view of a joint between the box structure of the aircraft and the pipe circuit according to the invention.

FIG. 7 illustrates a joint between an opening 112 formed in the box structure 106 and the circuit 20. Each opening 112 comprises a sealing gasket 27 which is configured to ensure the seal between the box structure 106 and the first double-skin conduit 230*a* or the second double-skin conduit 230*b* passing through the opening 112. The illustrated example shows the passage of the first double-skin conduit 230*a* in the region of the lower longitudinal member 106*b*, but it is understood that the joint would be identical for the passage of the second double-skin conduit 230*b* through the lower longitudinal member 106*a* or the lower longitudinal member 106*b*.

The sealing gasket 27 comprises a support 271 which has a generally identical shape to the opening 112 (i.e., circular in this case). The support 271 comprises a first surface 271*a* which extends parallel to the lower longitudinal member 106*a* and which is fixed thereto. The support 271 comprises a second surface 271*b* which generally extends parallel to the first double-skin conduit 230*a* and at a distance therefrom.

The sealing gasket 27 also comprises a sealing element 272 which has a first surface 272*a* clamping the second surface 271*b* of the support 271 and a second surface 272*b* which generally extends parallel to the lower longitudinal member 106*b*. The second surface 272*b* extends from the first surface 272*a* and in the direction of the first double-skin conduit 230*a*. A lip 272*c* which extends in the extension of the second surface 272*b* makes it possible to clamp the first double-skin conduit 230*a* in order to ensure the seal of the joint.

Moreover, FIG. 7 illustrates a variant of a second connector 24 in which the inlet orifice 241 has been omitted. Such a connector 24' makes it possible, for example, to connect two sections of the same double-skin conduit (the first double-skin conduit 230*a* in this example). More specifically, as a function of the length or the shape (for example, if elbows are necessary), the first and second double-skin conduits can be divided into a plurality of sections which extend in series. This connector 24' thus makes it possible to ensure the continuity of the central 231*a* and peripheral 232*a* channels of two consecutive sections of a double-skin conduit.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion system for an aircraft, comprising:
- a tank which is designed to contain a fuel and to be arranged in a wing of said aircraft, said tank comprising a first connection interface;
- a turbojet, comprising:
  - an engine having a second connection interface; and
  - a fan designed to blow an airflow from the front to the rear of the aircraft, a third connection interface being arranged inside the airflow upstream of the fan;
- a pipe circuit comprising a first connector and a single-skin conduit extending between said first connection interface of said tank and said first connector, and a second pipe portion comprising:
  - a second connector arranged between said first connector and said second interface of said engine;
  - a first double-skin conduit extending between said first connector and said second connector; and
  - a second double-skin conduit extending between said second connector and said second interface of said engine,
- wherein said first and second double-skin conduits each comprise a central conduit delimiting a central channel in which said fuel flows and a peripheral conduit extending about said central conduit and delimiting with said central conduit a peripheral channel;

wherein said second connector ensures a fluidic continuity between the central channels of the first and second double-skin conduits and a fluidic continuity between the peripheral channels of the first and second double-skin conduits;

wherein said second connector comprises an inlet orifice which opens into said peripheral channel of the first double-skin conduit or of the second double-skin conduit; and said pipe circuit also comprising an air supply conduit fluidically connecting said third connection interface of the fan and said inlet orifice so as to cause a part of said airflow from the fan to flow into said peripheral channels of the first and second double-skin conduits.

2. The system according to claim 1, wherein said second connector comprises:

a first plate and a second plate respectively receiving a first end of said first double-skin conduit and a first end of said second double-skin conduit;

a first sealing washer arranged between said first and second plates;

wherein one of said first and second plates comprises said inlet orifice;

wherein said first and second plates and said first washer each comprise a central bore, said central bores being configured to connect fluidically said central channels of said first and second double-skin conduits;

wherein said first plate comprises a plurality of first holes opening into the peripheral channel of said first double-skin conduit, wherein said second plate comprises, for each first hole, a second hole opening into the peripheral channel of said second double-skin conduit, and wherein said first washer comprises, for each first hole, a third hole fluidically connecting the associated first hole and second hole.

3. The system according to claim 2, wherein said second connector comprises a first clamp arrangement configured to clamp said first and second plates to one another.

4. The system according to claim 1, wherein said first connector comprises:

a third plate receiving a first end of said single-skin conduit and a fourth plate receiving a second end of said first double-skin conduit; and a second sealing washer arranged between said third and fourth plates;

wherein said fourth plate comprises a discharge orifice opening into said peripheral channel of said first double-skin conduit and fluidically connecting said peripheral channel of said first double-skin conduit to the outside of said pipe circuit; and wherein said third and fourth plates and said second washer each comprise a central bore, said central bores fluidically connecting said central channel of said first double-skin conduit and said single-skin conduit.

5. The system according to claim 4, wherein said first connector comprises a second clamp arrangement configured to clamp said third and fourth plates to one another.

6. An aircraft comprising a propulsion system according to claim 1 and a box structure of an engine pylon, said box structure forming a primary structure and comprising a lower longitudinal member, said propulsion system being fixed to said lower longitudinal member.

7. The system according to claim 1, wherein said second interface comprises a fifth plate receiving a second end of said second double-skin conduit, said fifth plate comprising:

a central bore extending coaxially and being fluidically connected to said central conduit of said second double-skin conduit, said central bore also being designed to be fluidically connected to a circuit for supplying said engine with fuel; and a discharge orifice fluidically connecting said peripheral channel of said second double-skin conduit to the outside of said pipe circuit.

8. An aircraft comprising a propulsion system according to claim 7 and a box structure of an engine pylon, said box structure forming a primary structure and comprising a lower longitudinal member, said propulsion system being fixed to said lower longitudinal member.

9. The aircraft according to claim 8, wherein said single-skin conduit extends above said box structure, and wherein at least one of said first double-skin conduit or said second double-skin conduit pass through said box structure in a region of at least one opening.

10. The aircraft according to claim 9, wherein each opening comprises a sealing gasket configured to ensure a seal between said box structure and said first double-skin conduit or said second double-skin conduit passing through said opening.

11. The aircraft according to claim 8, further comprising a secondary structure fixed below said box structure and to the rear of said fan, said second interface comprising a third fixing arrangement configured to fix said second interface to said secondary structure.

* * * * *